(12) United States Patent
Pickett et al.

(10) Patent No.: US 9,978,248 B2
(45) Date of Patent: May 22, 2018

(54) LOW COST ONLINE CONDITION MONITORING

(71) Applicants: Stephen Matthew Darcy Pickett, Calgary (CA); Daren Paul Tremaine, Silverton (CA); Timothy Andrew Harris, Calgary (CA); Shawn William Gibson, Calgary (CA); Lois Gayle Wride, Calgary (CA)

(72) Inventors: Stephen Matthew Darcy Pickett, Calgary (CA); Daren Paul Tremaine, Silverton (CA); Timothy Andrew Harris, Calgary (CA); Shawn William Gibson, Calgary (CA); Lois Gayle Wride, Calgary (CA)

(73) Assignee: SKF CANADA LIMITED, Scarborough (CA)

( * ) Notice: Subject to any disclaimer, the term of this patent is extended or adjusted under 35 U.S.C. 154(b) by 0 days. days.

(21) Appl. No.: 15/240,358

(22) Filed: Aug. 18, 2016

(65) Prior Publication Data
US 2017/0098363 A1    Apr. 6, 2017

Related U.S. Application Data

(60) Provisional application No. 62/236,620, filed on Oct. 2, 2015.

(51) Int. Cl.
*G08B 21/18* (2006.01)
*G01M 99/00* (2011.01)
*G05B 23/00* (2006.01)

(52) U.S. Cl.
CPC ......... *G08B 21/187* (2013.01); *G01M 99/008* (2013.01); *G05B 23/00* (2013.01)

(58) Field of Classification Search
CPC . G08B 21/187; G08B 25/016; G01M 99/008; G05B 23/00; G08G 1/20; G07C 5/085
See application file for complete search history.

(56) References Cited

U.S. PATENT DOCUMENTS

| 5,638,273 A * | 6/1997 | Coiner ................... G07C 5/085 360/5 |
| 7,412,708 B1 * | 8/2008 | Khan ................. G06F 17/30979 707/999.006 |
| 2002/0087286 A1 * | 7/2002 | Mitchell ................. G06F 17/18 702/127 |
| 2013/0267795 A1 * | 10/2013 | Cosentino ............ A61B 5/0002 600/301 |

* cited by examiner

*Primary Examiner* — Kabir A Timory
(74) *Attorney, Agent, or Firm* — Bryan Peckjian; SKF USA Inc. Patent Dept.

(57) ABSTRACT

Aspects include performing online condition monitoring. Online condition monitoring includes compiling the digital sensor data to produce compiled data and processing the compiled data via a signal analysis operation to produce digitally analyzed data. Further, online condition monitoring includes comparing the digitally analyzed data to at least one threshold to output corresponding values and utilizing the corresponding value to determine whether to issue an event notification.

8 Claims, 8 Drawing Sheets

LOW COST ONLINE CONDITION MONITORING

BACKGROUND

In general, contemporary monitoring devices have built in self-protection to prevent immediate damage to mechanical machinery, bearing components, and/or control electronics coupled to the contemporary monitoring devices. This self-protection is a reactive mechanism that, when triggered, stops the mechanical machinery to prevent catastrophic damage and to allow repair. This method of operation is called 'run to failure'. The machine can often be shut down without warning at any time. The repairs may need to be completed on overtime or take an extended time if spare parts are not available. Because this self-protection is costly and disruptive to the end user, contemporary online monitoring is utilized to process and monitor analog sensor data from sensors on the mechanical machinery to prevent reactive failures.

Particularly, the contemporary online monitoring produces event capture data from analog sensor data. The event capture data is then stored on a database to await post analysis. With contemporary online monitoring, preventative actions are taken based on the output of the post analysis.

Due to the nature of the mechanical machinery and the analog sensor data, the contemporary devices must utilize specialized hardware to perform the conditioning. Specialized hardware is a very use specific solution that is expensive to replace, upgrade, and/or maintain.

SUMMARY

Embodiments include a method for performing online condition monitoring. Online condition monitoring includes compiling the digital sensor data to produce compiled data and processing the compiled data via a signal analysis operation to produce digitally analyzed data. Further, online condition monitoring includes comparing the digitally analyzed data to at least one threshold to output corresponding values and utilizing the corresponding value to determine whether to issue an event notification.

Additional embodiments include systems and computer program products to implement the above method.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of embodiments are apparent from the following detailed description taken in conjunction with the accompanying drawings in which:

DETAILED DESCRIPTION

In view of the above, embodiments disclosed herein may include an online condition monitoring system, method, and/or computer program product (herein online condition monitoring system) that utilizes digitized sensor data available from a low cost analog to digital converter to apply online condition monitoring analysis via scalable computing hardware. It will be appreciated that the online condition monitoring system performs the online condition monitoring analysis on digitized sensor data that originates from a low cost data acquisition device.

For example, the online condition monitoring system can be connected to a magnetic bearing control system and utilize digitized, real-time, magnetic bearing sensor data available from the magnetic bearing control system to apply the online condition monitoring analysis, with the analysis running on scalable computing hardware. In this way, no specialized hardware is required by the online condition monitoring system.

Figure 1A:
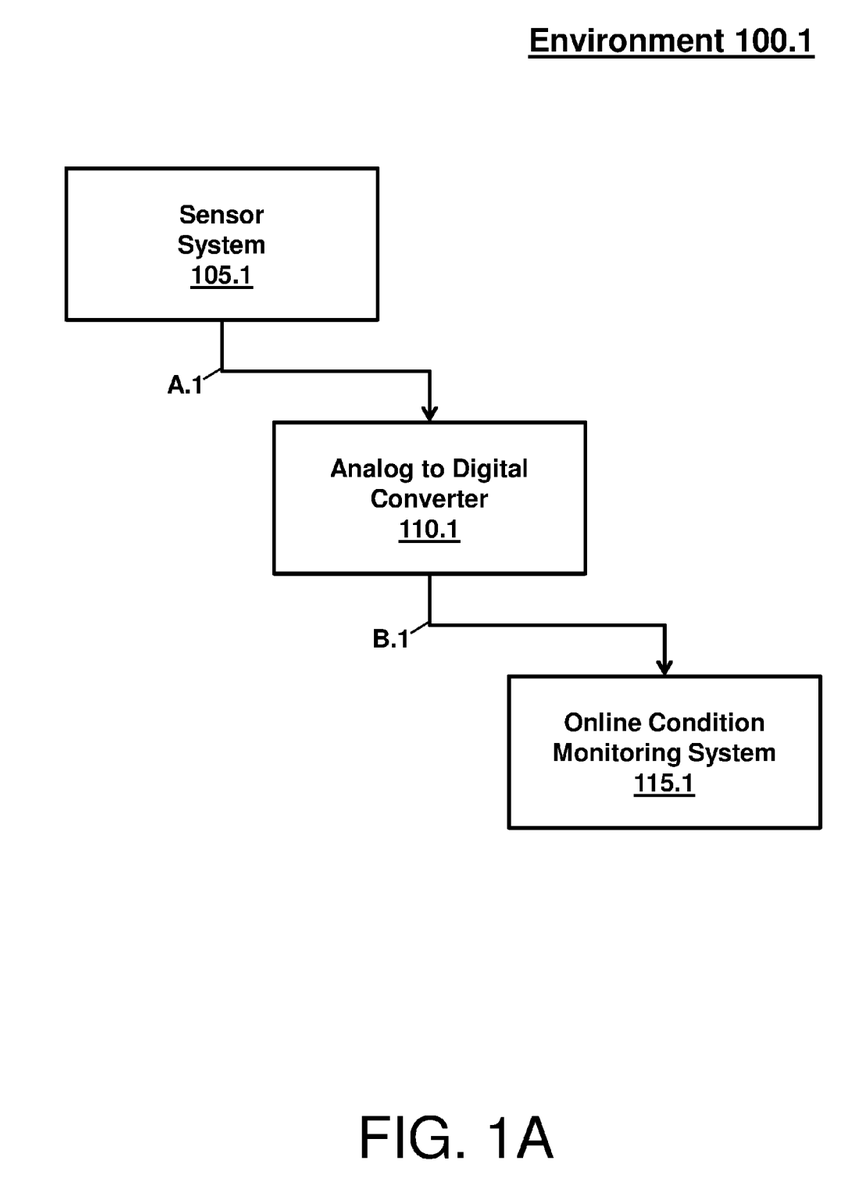
FIG. 1A illustrates an environment for online condition monitoring according to an embodiment.
Figure 1B:
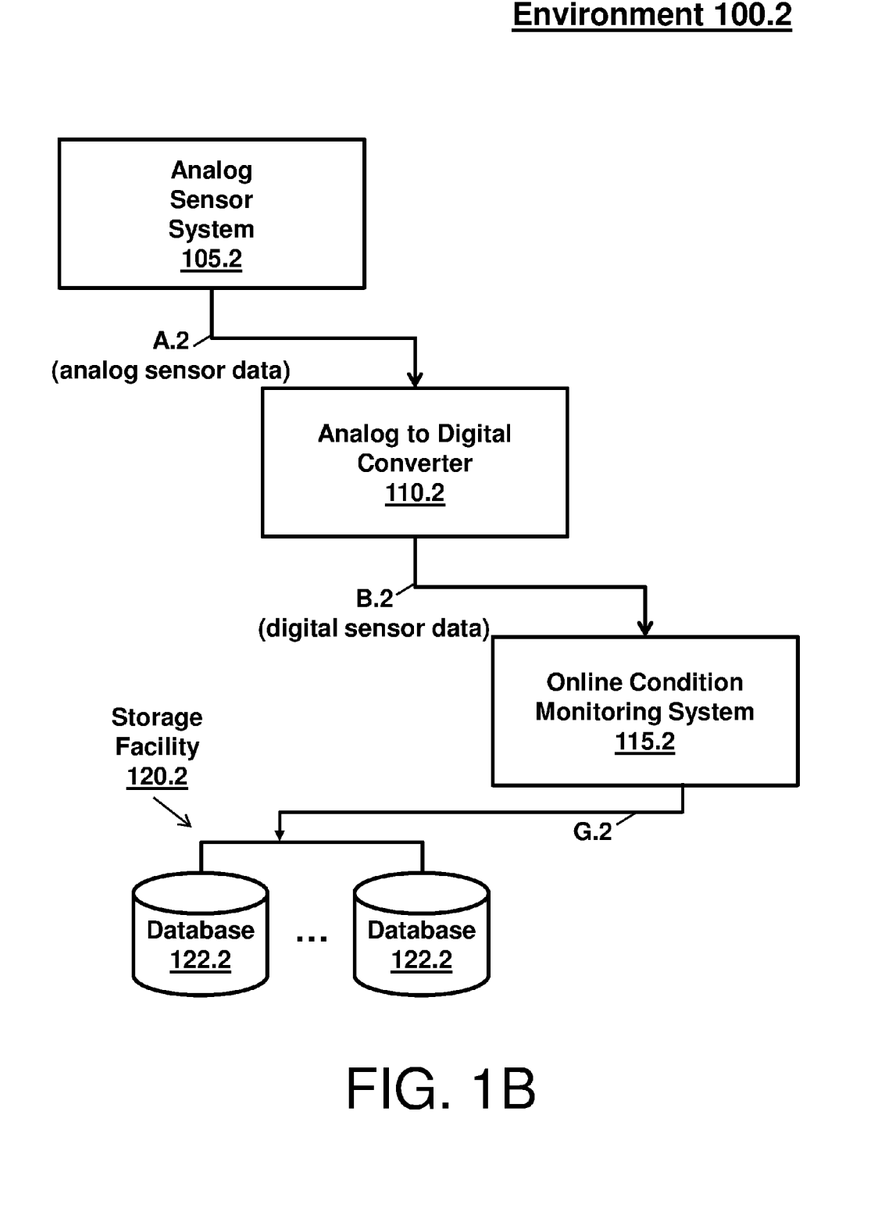
FIG. 1B illustrates an environment for online condition monitoring according to an embodiment.
Figure 1C:
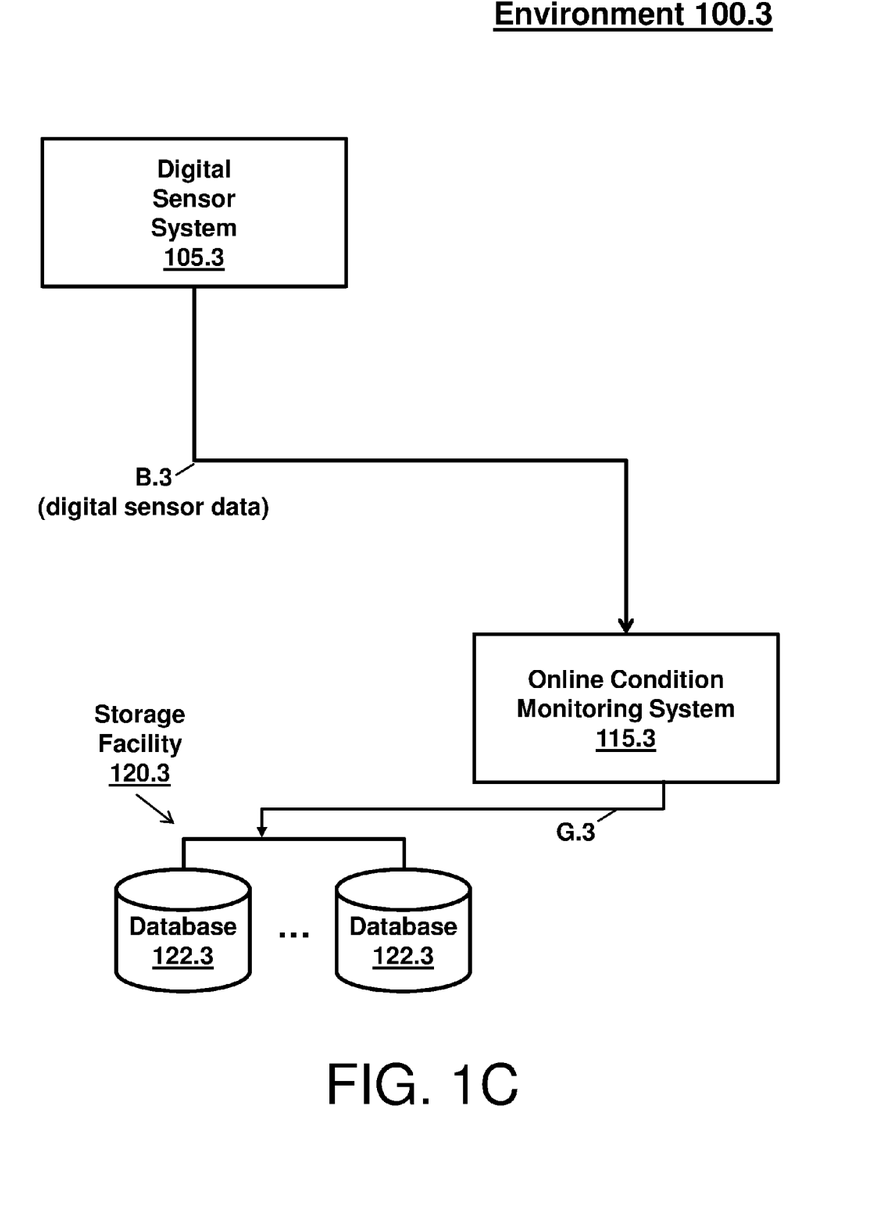
FIG. 1C illustrates an environment for online condition monitoring according to an embodiment.

Turning now to FIGS. 1A, 1B, and 1C, embodiments of the online condition monitoring system described above will now be described. With respect to FIG. 1A, an environment 100.1 for online condition monitoring is generally shown in accordance with an embodiment. As depicted, the environment 100.1 includes a sensor system 105.1, an analog-to-digital (A/D) converter 110.1, and an online condition monitoring system 115.1. In operation, the sensor system 105.1 generates and provides analog sensor data (see arrow A.1) to the A/D converter 110.1. The A/D converter 110.1 converts the analog sensor data into digital sensor data and provides the digital sensor data (see arrow B.1) to the online condition monitoring system 115.1. The online condition monitoring system 115.1, in turn, performs an event capture and condition monitoring analysis on the digital sensor data. The environment 100.1, the sensor system 105.1, the A/D converter 110.1, and the online condition monitoring system 115.1 may include and/or employ any number and combination of sensors, computing devices, and networks utilizing various communication technologies, as described below, that enable the online condition monitoring system 115.1 to perform the event capture and condition monitoring analysis on the digital sensor data, as further described herein.

With respect to FIG. 1B, an environment 100.2 for online condition monitoring is generally shown in accordance with an embodiment. As depicted, the environment 100.2 includes an analog sensor system 105.2, an A/D converter 110.2, an online condition monitoring system 115.2, and a storage facility 120.2 that includes a plurality of databases 122.2. In operation, the analog sensor system 105.2 generates and provides analog sensor data (see arrow A.2) to the A/D converter 110.2. The A/D converter 110.2 converts the analog sensor data into digital sensor data and provides the digital sensor data (see arrow B.2) to the online condition monitoring system 115.2. The online condition monitoring system 115.2, in turn, performs an event capture and condition monitoring analysis on the digital sensor data. The online condition monitoring system 115.2 can also store (see arrow G.2) the digital sensor data based on the event capture and condition monitoring analysis and/or availability within the storage facility 120.2. The environment 100.2, the analog sensor system 105.2, the A/D converter 110.2, the online condition monitoring system 115.2, and the storage facility 120.2 may include and/or employ any number and combination of sensors, computing devices, and networks utilizing various communication technologies, as described below, that enable the online condition monitoring system 115.2 to perform the event capture and condition monitoring analysis on the digital sensor data, as further described herein.

With respect to FIG. 1C, an environment 100.3 for online condition monitoring is generally shown in accordance with an embodiment. As depicted, the environment 100.1 includes a digital sensor system 105.3, an online condition monitoring system 115.3 and a storage facility 120.3 that includes a plurality of databases 122.3. In operation, the digital sensor system 105.3 generates and provides digital sensor data (see arrow B.3) to the online condition monitoring system 115.3. The online condition monitoring system 115.3, in turn, performs an event capture and condition monitoring analysis on the digital sensor data. The online condition monitoring system 115.3 can also store (see arrow G.3) the digital sensor data based on the event capture and condition monitoring analysis and/or availability within the storage facility 120.3. The environment 100.3, the digital sensor system 105.3, the online condition monitoring system 115.3, and the storage facility 120.3 may include and/or employ any number and combination of sensors, computing devices, and networks utilizing various communication technologies, as described below, that enable the online condition monitoring system 115.3 to perform the event capture and condition monitoring analysis on the digital sensor data, as further described herein.

The above sensor systems 105 (e.g., the sensor system 105.1, the analog sensor system 105.2, and the digital sensor system 105.3) can include at least one sensor that is operatively coupled to mechanical machinery, bearing components, control electronics, and/or power electronics. A sensor is any converter that measures physical quantities and converts these physical quantities into a signal (e.g., raw sensor data, such as voltage in analog form; also referred to as analog sensor data). Thus, a sensor can be any device configured to detect status/condition information of the mechanical machinery, bearing components, and/or control electronics and produce the analog sensor data. Examples of sensors include, but are not limited to, strain and vibration gauges that measure the physical stress applied (e.g., fiber optic gauges, foil gauges, capacitive gauges, etc.) and temperature sensors that measures the temperature characteristics and/or the physical change in temperature (e.g., fiber optic temperature sensors, heat meters, infrared thermometers, liquid crystal thermometers, resistance thermometers, temperature strips, thermistors, thermocouples, etc.).

The above A/D converters 110 (e.g., the A/D converter 110.1 and the A/D converter 105.2) can be low cost analog-to-digital converter devices that converts a continuous physical quantity (e.g., raw sensor data) to a digital number that represents amplitude of the continuous physical quantity (e.g., digital sensor data). In this way, the A/D converters 110 are able to receive and transform raw sensor data from the sensor system 105.1 to digital sensor data. The digital sensor data is a raw, real-time (low latency), unfiltered, unorganized, high speed (high bandwidth) digitized data.

The above online condition monitoring systems 115 (e.g., the online condition monitoring systems 115.1, the online condition monitoring systems 115.2, and the online condition monitoring systems 115.3) can be a processing system (e.g., processing system 500 of FIG. 5) as described below. The online condition monitoring systems 115 can be configured to receive the digital sensor data from the A/D converter 110. The online condition monitoring systems 115 can also be configured to perform an event capture and condition monitoring analysis on the digital sensor data. The event capture and condition monitoring analysis includes determining whether to store resulting event capture data (into a database for post analysis) and/or determining whether to generate a notification based on the event capture data. Thus, because 'raw' digital data is consumed by the online condition monitoring systems 115, the online condition monitoring systems 115 can perform data read, processing, and decision operations in real-time and without latency.

The above storage facilities 120 (e.g., the storage facility 120.2 and the storage facility 120.3) is in communication with the online condition monitoring systems 115, such that information, data structures, and documents including the digital sensor data may be collected and archived in support of the processes described herein. The plurality of databases 122 (e.g., the plurality of databases 122.2 and the plurality of databases 122.3), such as a data repository or other data store, and may include various kinds of mechanisms for storing, accessing, and retrieving various kinds of data, including a hierarchical database, a set of files in a file system, an application database in a proprietary format, a relational database management system (RDBMS), etc., capable of storing data.

Figure 2:
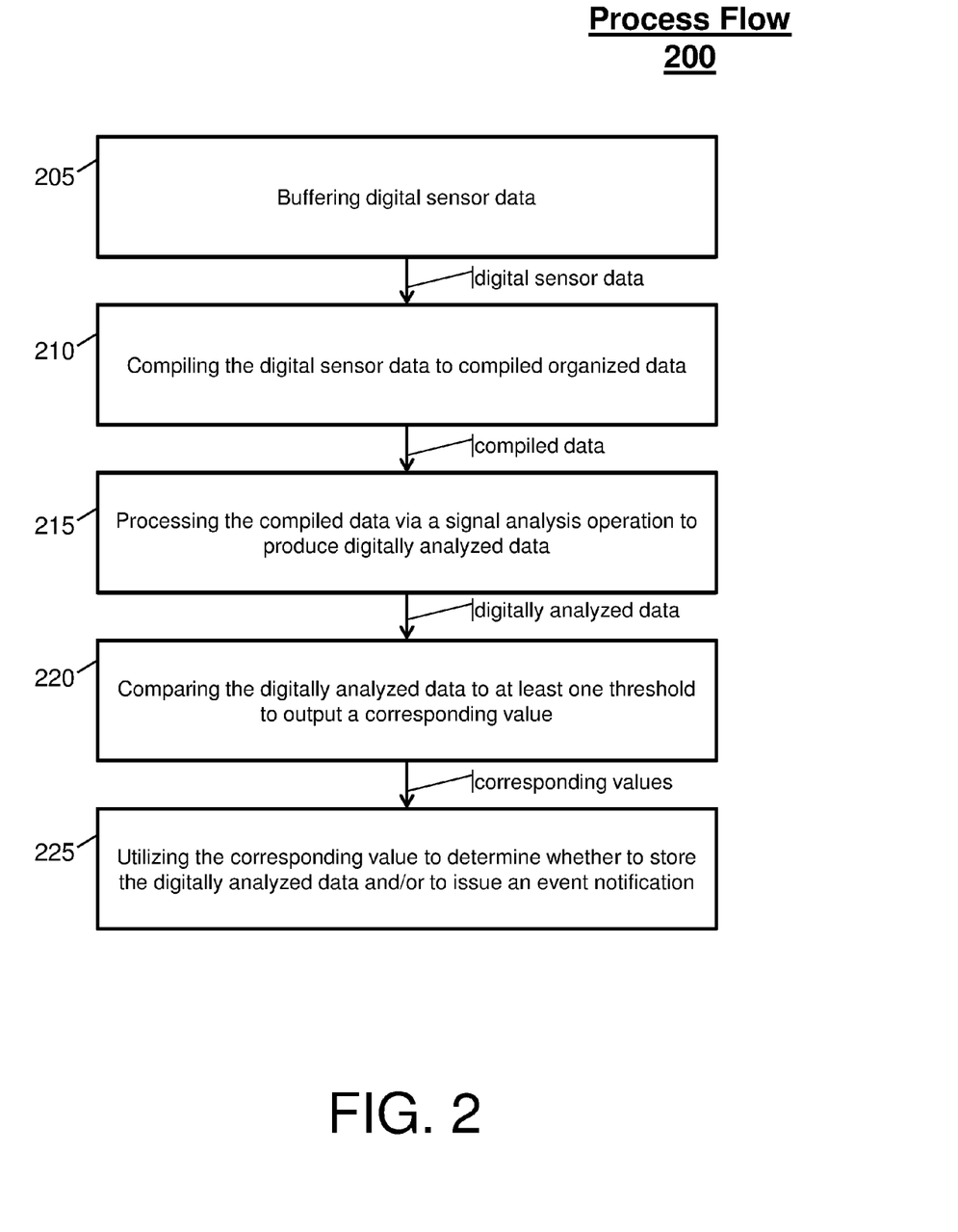
FIG. 2 illustrates a process flow of an online condition monitoring system according to an embodiment.

FIG. 2 illustrates a process flow 200 of an online condition monitoring system (e.g., the online condition monitoring system 115), as an example of the event capture and condition monitoring analysis, according to an embodiment. While the process flow 200 is be described with respect to general references to the above environments 100, it is appreciated that the process flow 200 can be adapted to a particular environment (e.g., 100.1, 100.2, 101.3) or combination thereof.

The process flow 200 begins at block 205, where the online condition monitoring system 115 buffers digital sensor data received from a sensor system (e.g., the A/D converter 110). The online condition monitoring system 115 utilizes a buffering mechanism to prevent data loss, such as during intermittent communication connections. The buffering mechanism can be a data buffer or a region of physical memory storage of the online condition monitoring system 115 used to temporarily store the digital sensor data. Note that the digital sensor data, in this embodiment, is raw, real-time (low latency), unfiltered, unorganized, high speed (high bandwidth) digitized data.

At block 210, the online condition monitoring system 115 compiles (and/or organizes) the digital sensor data to produce compiled data. At block 215, the online condition monitoring system 115 processes the compiled data via a signal analysis operation to produce digitally analyzed data. For instance, the signal analysis operation includes real-time (low latency) signal processing on the compiled data (raw but organized data) to further organize, transform, and show event signatures, which are captured in the digitally analyzed data. Event signatures are data value that correspond to a real-time state of the mechanical machinery, the bearing components, and/or the control electronics being monitored by the online condition monitoring system 115.

At block 220, the online condition monitoring system 115 compares the digitally analyzed data to at least one threshold to output corresponding values. The corresponding values reflect a state per threshold, which in turn corresponds to each sensor of the sensor system 105. That is, a predefined set of limits, thresholds, ranges, and/or benchmarks are utilize in comparing operation against the event signatures by the online condition monitoring system 115 to determine a normal operation, operation within an accepted threshold, failure indications, complete failures, etc. of the mechanical machinery, the bearing components, and/or the control electronics.

At block 225, the online condition monitoring system 115 utilizes the corresponding value to determine whether to store the digitally analyzed data and/or to issue an event notification. In addition along with the digitally analyzed data, digital data and compiled data can be stored. Determining whether to store the digitally analyzed data can be based on the amount of storage available, a state of the digitally analyzed data, a state of the corresponding value, etc. The event notification, in general, are identifying information (or non-existence of the information) targeted to systems or users responsible for the mechanical machinery, the bearing components, and/or the control electronics being monitored by the online condition monitoring system 115. Examples of notifications may include, but are not limited to, any combination of audio alerts (e.g., buzzers, bells, tones, telephone calls, cellphone calls, VoIP calls, voicemails, loudspeaker announcements, etc.), visual displays (e.g., flashing lights, display pop-ups), pager (e.g., SNPP), electronic mail (e.g., POP, IMAP, SMTP), desktop alerts (e.g., dialog, balloon, modal window, toast, etc.), instant messaging (e.g., IRC, ICQ, AIM, Yahoo! Messenger, MSN, XMPP, iMessage), text messaging (e.g., SMS), and the like.

Figure 3:
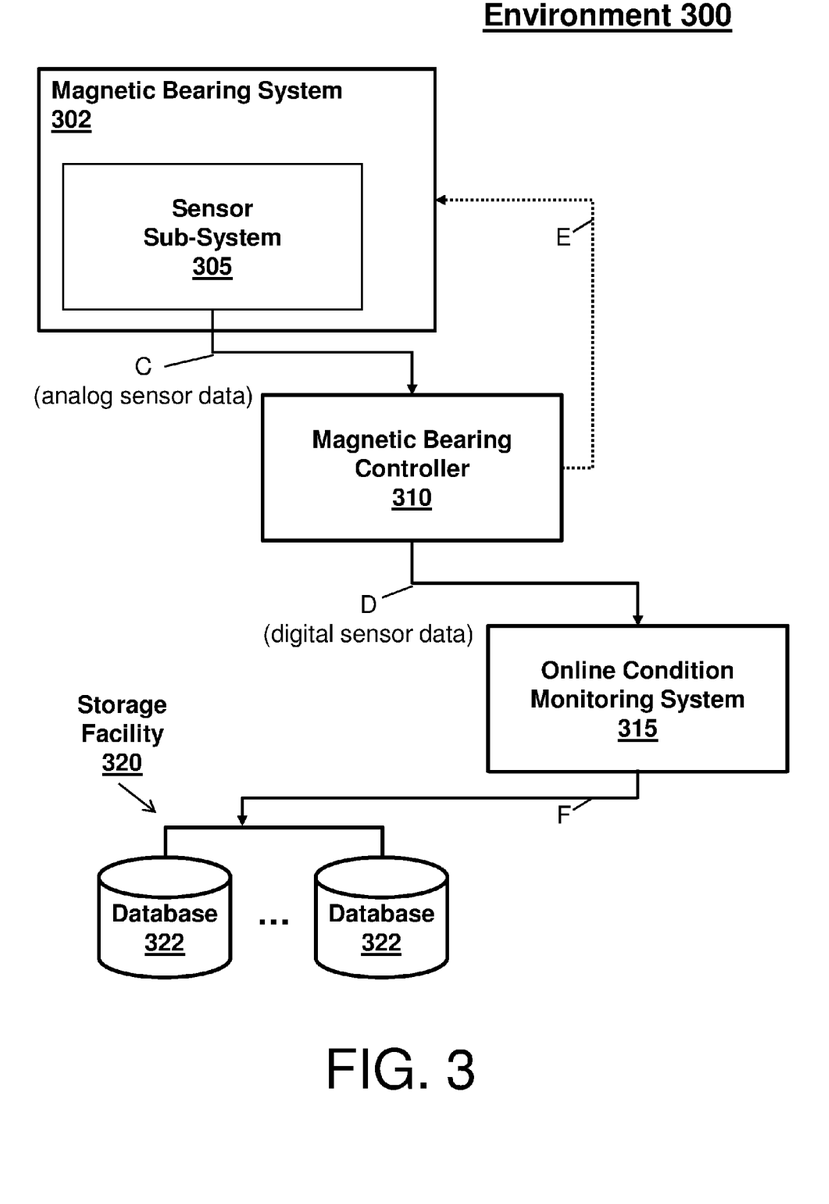
FIG. 3 illustrates another environment for online condition monitoring according to an embodiment.

In view of the above, an embodiment will now be described with respect to FIG. 3. In FIG. 3, an environment 300 for condition monitoring is generally shown. As depicted, the environment 300 includes a magnetic bearing system 302, a sensor sub-system 305, a magnetic bearing controller 310, an online condition monitoring system 315, and a storage facility 320 that includes a plurality of databases 322. The environment 300 and components therein may include and/or employ any number and combination of sensors, computing devices, and networks utilizing various communication technologies, as described below, that enable the online condition monitoring system 315 to perform the event capture and condition monitoring analysis on the digital sensor data, as further described herein.

The magnetic bearing system 302 is an example system that includes mechanical machinery and bearing components. The magnetic bearing controller 310 provides control signals that cause the magnetic bearing system 302 to operate, where these signals can be based on raw sensor data or digital sensor data. The magnetic bearing controller 310 is also able to receive and transform the raw sensor data from the sensor sub-system 305 to digital sensor data.

The storage facility 320 includes a plurality of databases 322, such as a data repository or other data store, and may include various kinds of mechanisms for storing, accessing, and retrieving various kinds of data, including a hierarchical database, a set of files in a file system, an application database in a proprietary format, a relational database management system (RDBMS), etc., capable of storing data. The storage facility 320 is in communication with the online condition monitoring system 315, such that information, data structures, and documents including the digital sensor data may be collected and archived in support of the processes described herein.

The sensor sub-system 305 and the online condition monitoring system 315 are respectively examples of the sensor systems 105 and the online condition monitoring systems 115 described above. Thus, the sensor sub-system 305 and the online condition monitoring system 315 together detect and monitor the condition of the magnetic bearing system 302.

In an example operation of the environment 300, the sensor system 305 generates and provides analog sensor data (see arrow C) to the magnetic bearing controller 310. The magnetic bearing controller 310 converts and processes the analog sensor data. For instance, the magnetic bearing controller 310 converts the analog sensor data into digital sensor data and provides the digital sensor data (see arrow D) to the online condition monitoring system 315. Further, the magnetic bearing controller 310 can, in turn, control the magnetic bearing system 302 based on the processing of the analog sensor data (see arrow E). Further, the magnetic bearing controller can provide digital sensor data that represents the status of the magnetic bearing controller power electronics. The online condition monitoring system 315, in turn, performs an event capture and condition monitoring analysis on the digital sensor data. The online condition monitoring system 315 also stores (see arrow F) the digital sensor data based on the event capture and condition monitoring analysis and/or availability within the storage facility 320.

Figure 4A:
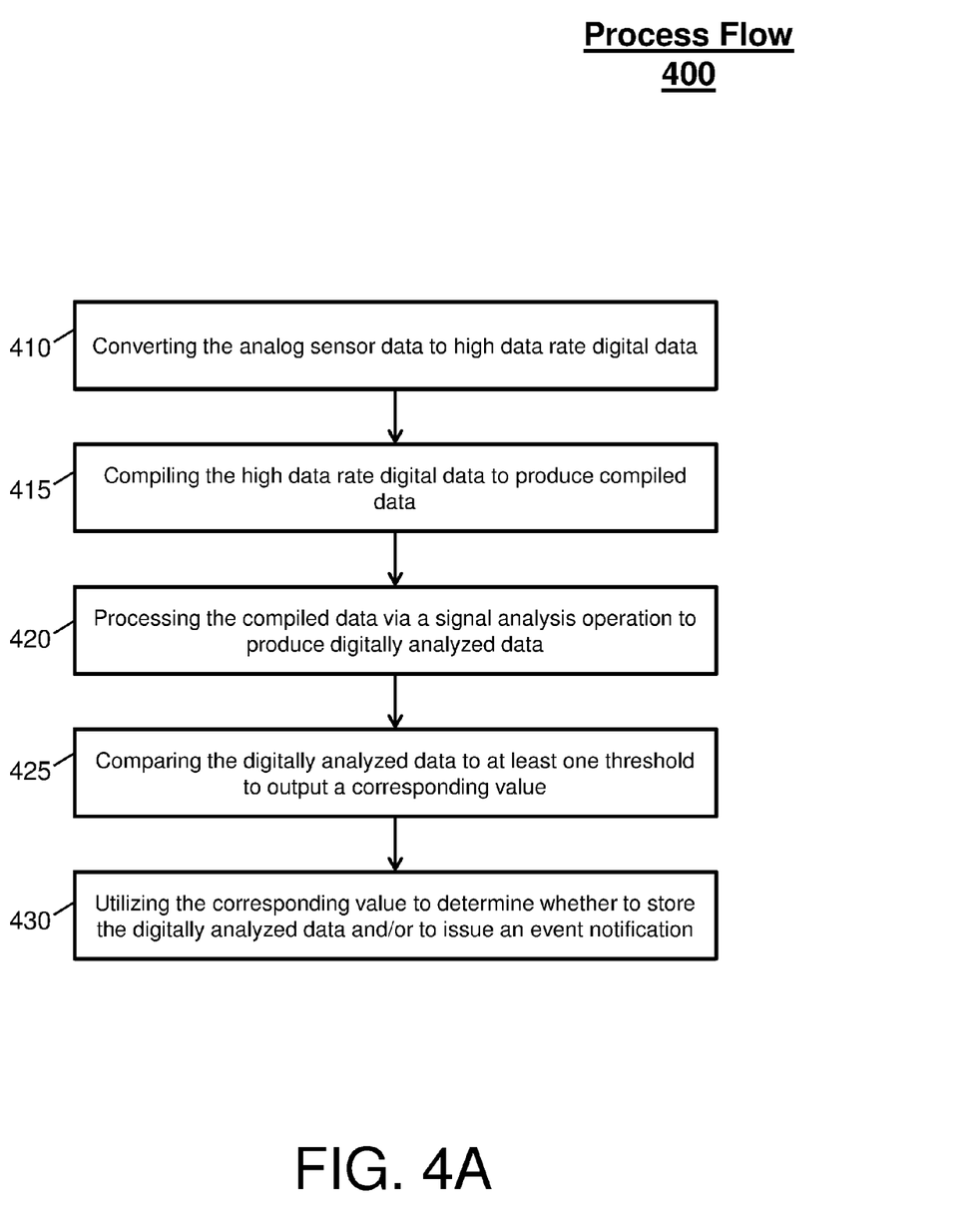
FIG. 4A illustrates another process flow of an online condition monitoring system according to an embodiment.

FIG. 4A illustrates a process flow 400 of an environment (e.g., the environment 300), as an example of the event capture and condition monitoring analysis, according to an embodiment. The process flow 400 begins at block 410, where the magnetic bearing controller 310 converts analog sensor data received from the sensor system 305 to high data rate digital sensor data. The digital sensor data is produced by the sensor system 305 via at least one sensor coupled to a component of the magnetic bearing system 302. This high data rate digital data is then passed to the online condition monitoring system 315.

At block 415, the online condition monitoring system 315 compiles (and/or organizes) the high data rate digital data to produce compiled data. The online condition monitoring system 315 can also buffer the high data rate digital data received from the sensor system 305 via a buffering mechanism as described above. Note that the high data rate digital data, in this embodiment, is raw, real-time (low latency), unfiltered, unorganized, high speed (high bandwidth) digitized data.

At block 420, the online condition monitoring system 315 processes the compiled data via a signal analysis operation to produce digitally analyzed data. For instance, the signal analysis operation includes real-time (low latency) signal processing on the compiled data (raw but organized data) to further organize, transform, and show event signatures, which are captured in the digitally analyzed data.

At block 425, the online condition monitoring system 315 compares the digitally analyzed data to at least one threshold to output corresponding values. That is, a predefined set of limits, thresholds, ranges, and/or benchmarks are utilize in comparing operation by the online condition monitoring system 315 to determine a state of the mechanical machinery, the bearing components, and/or the control electronics being monitored by the online condition monitoring system 315. The corresponding values reflect the state per threshold, which in turn corresponds to each sensor of the sensor system 305.

At block 430, the online condition monitoring system 315 utilizes the corresponding value to determine whether to store the digitally analyzed data and/or to issue an event notification. Determining whether to store the digitally analyzed data can be based on the amount of storage available, a state of the digitally analyzed data, a state of the corresponding value, etc. The event notification, in general, are identifying information (or non-existence of the information) targeted to systems or users responsible for the mechanical machinery, the bearing components, and/or the control electronics being monitored by the online condition monitoring system 315.

Figure 4B:
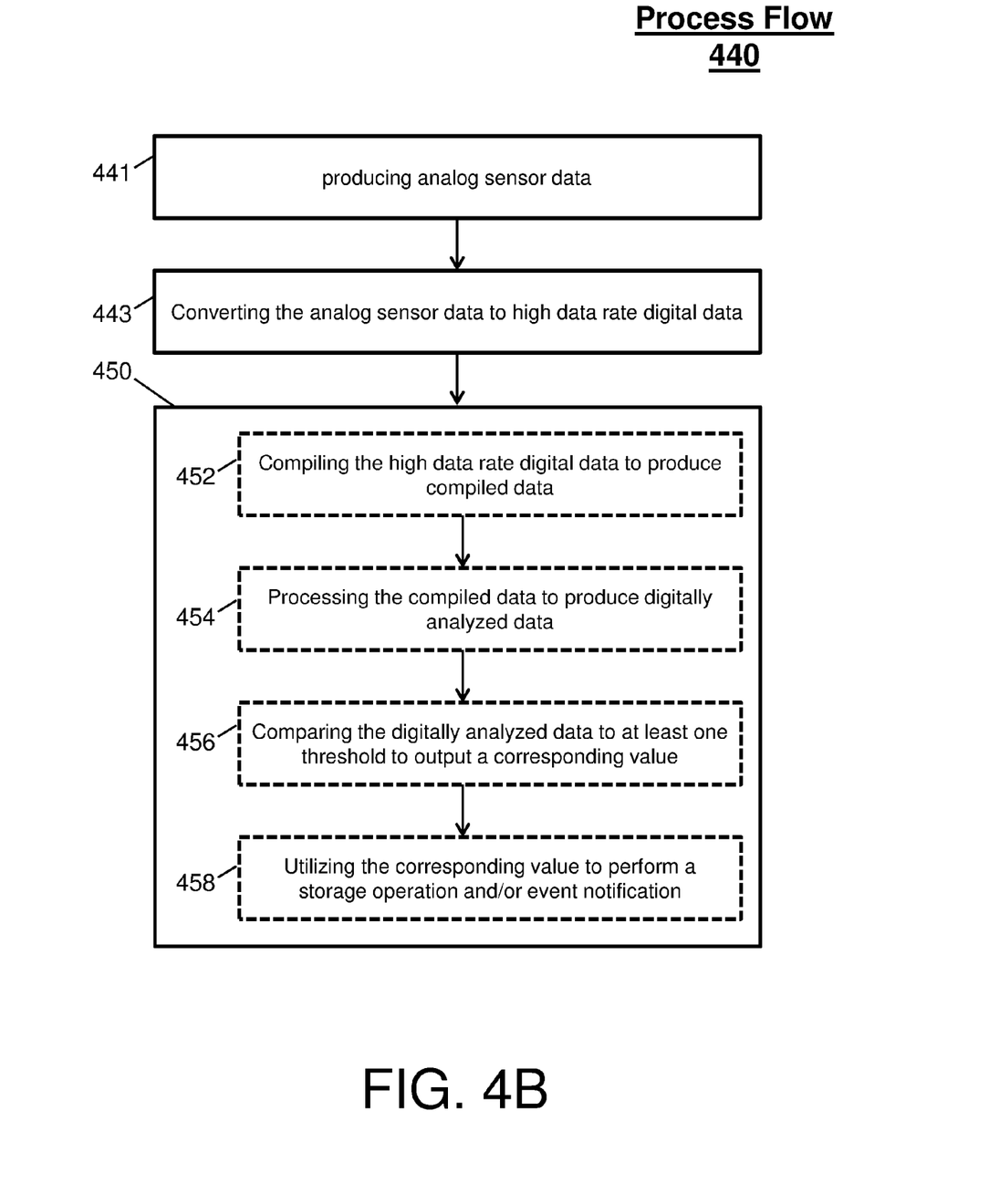
FIG. 4B illustrates another process flow of an online condition monitoring system according to an embodiment.

FIG. 4B illustrates a process flow 440 of an environment (e.g., the environment 300), as an example of the event capture and condition monitoring analysis, according to an embodiment. The process flow 440 begins at block 441, where analog sensor data is produced. The sensor data can be produced by the sensor system 305 via at least one sensor coupled to a component of the magnetic bearing system 302. At block 443, the analog sensor data is converted to high data rate digital data. The magnetic bearing controller 310 is an example system that can convert the sensor data to high data rate digital data. This high data rate digital data can be then passed to the online condition monitoring system 315.

At block 450, storage operations and/or event notification operations are performed with respect to the high data rate digital data. The online condition monitoring system 315 can perform the operations of block 450. In an embodiment, these operations include: at block 452, compiling the high data rate digital data to produce compiled data; at block 454, processing the compiled data via a signal analysis operation to produce digitally analyzed data; at block 456, comparing the digitally analyzed data to at least one threshold to output corresponding values; and at block 458, utilizing the corresponding value to perform storage operations and/or event notifications.

Figure 5:
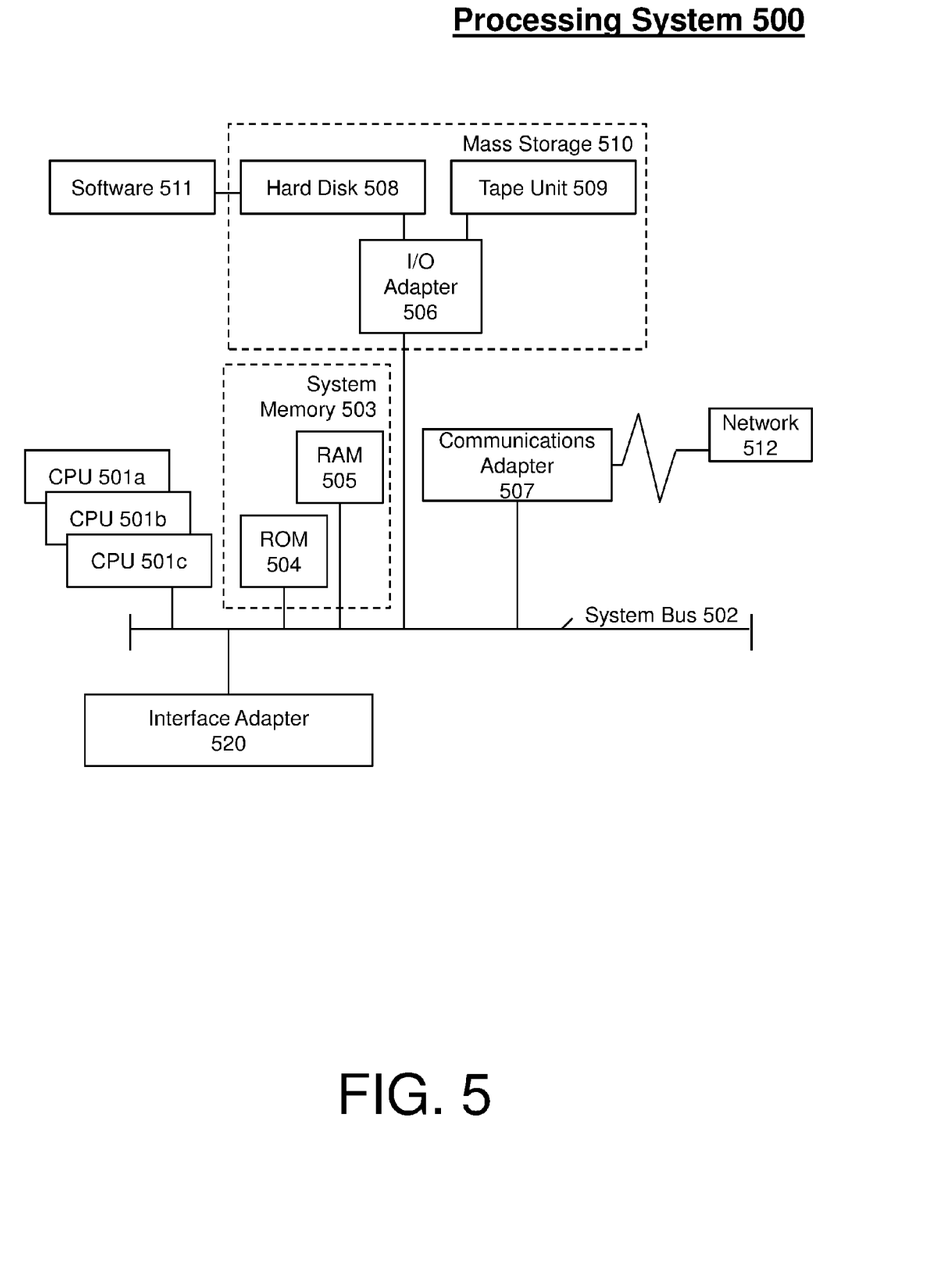
FIG. 5 illustrates a processing system according to an embodiment.

Referring now to FIG. 5, there is shown an embodiment of a processing system 500 for implementing the teachings herein. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501. The processing system can be an embedded system with a dedicated function within a larger mechanical or electrical system.

FIG. 5 further depicts an input/output (I/O) adapter 506 and a network adapter 507 coupled to the system bus 502. I/O adapter 506 may be a small computer system interface (SCSI) adapter that communicates with a hard disk 508 and/or tape storage drive 509 or any other similar component. I/O adapter 506, hard disk 508, and tape storage drive 509 are collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to perform a method, such as the process flows above. Network adapter 507 interconnects system bus 502 with an outside network 512 enabling processing system 500 to communicate with other such systems (e.g., cellular communication systems). A screen (e.g., a display monitor) can be connected to system bus 502 by display adapter, which may include a graphics controller to improve the performance of graphics intensive applications and a video controller. Additional input/output devices are shown as connected to system bus 502 via an interface adapter 520. Note that a keyboard, a mouse, and/or speaker can be interconnected to system bus 502. In an embodiment, adapters 506, 507, and 520 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI).

Thus, as configured in FIG. 5, processing system 505 includes processing capability in the form of processors 501, and, storage capability including system memory 503, mass storage 510, and the interface adapter 520. In one embodiment, a portion of system memory 503 and mass storage 510 collectively store an operating system to coordinate the functions of the various components shown in FIG. 5.

Technical effects and benefits of embodiments of the online condition monitoring described herein include eliminating specialized hardware by directly receiving and processing raw data (thereby eliminating the replacement, upgrading, and/or maintenance costs associated with specialized hardware). Thus, embodiments described herein are necessarily rooted in the monitoring system to perform proactive operations to overcome problems specifically arising in the realm of contemporary monitoring devices (e.g., these problems include the costly and disruptive nature self-protection and delays in maintenance due to post analysis that result in mechanical machinery failure).

According to an embodiment, a method is provided. The method comprising compiling, by a processor coupled to a memory, digital data to produce compiled data; processing, by the processor, the compiled data to produce digitally analyzed data; comparing, by the processor, the digitally analyzed data to at least one threshold to output corresponding values; and utilizing, by the processor, the corresponding value to determine whether to issue an event notification.

According to another embodiment or the method embodiment above, the digital data can be high data rate digital data.

According to another embodiment or any of the method embodiments above, the high data rate digital data is raw, real-time, high speed digitized data received.

According to another embodiment or any of the method embodiments above, the receiving of the real-time, high speed digitized data can enable the processor to perform the compiling, the processing, the comparing, and the utilizing in real-time.

According to another embodiment or any of the method embodiments above, the digital data can be derived from sensor data of at least one sensor coupled to a mechanical system.

According to another embodiment or any of the method embodiments above, the mechanical system can include mechanical machinery, bearing components, or control electronics.

According to another embodiment or any of the method embodiments above, the method can further comprise buffering the digital data prior to the compiling of the digital data.

According to another embodiment or any of the method embodiments above, the method can further comprise utilizing the corresponding value to determine whether to store the digitally analyzed data.

According to another embodiment or any of the method embodiments above, the determining of whether to store the digitally analyzed data can be based on a state of the corresponding value, an amount of storage available, or a state of the digitally analyzed data.

According to another embodiment or any of the method embodiments above, a signal analysis operation can be utilized to process the compiled data, the signal analysis operation includes real-time signal processing on the compiled data to captured event signatures in the digitally analyzed data.

According to an embodiment, a system is provided. The system comprises a processor and a memory storing program instructions thereon. The program instructions executable by a processor to cause the system to perform compiling digital data to produce compiled data; processing the compiled data via a signal analysis operation to produce digitally analyzed data; comparing the digitally analyzed data to at least one threshold to output corresponding values; and utilizing the corresponding value to determine whether to issue an event notification.

According to another embodiment or the system embodiment above, the digital data can be high data rate digital data.

According to another embodiment or any of the system embodiments above, the high data rate digital data can be raw, real-time, high speed digitized data received.

According to another embodiment or any of the system embodiments above, the receiving of the real-time, high speed digitized data can enable the processor to perform the compiling, the processing, the comparing, and the utilizing in real-time.

According to another embodiment or any of the system embodiments above, the digital data can be derived from sensor data of at least one sensor coupled to a mechanical system.

According to another embodiment or any of the system embodiments above, the mechanical system can include mechanical machinery, bearing components, or control electronics.

According to another embodiment or any of the system embodiments above, the program instructions can be further executable by the processor to cause the system to perform buffering the digital data prior to the compiling of the digital data.

According to another embodiment or any of the system embodiments above, the program instructions can be further executable by the processor to cause the system to perform utilizing the corresponding value to determine whether to store the digitally analyzed data.

According to another embodiment or any of the system embodiments above, a signal analysis operation can be utilized to process the compiled data, the signal analysis operation includes real-time signal processing on the compiled data to captured event signatures in the digitally analyzed data.

Embodiments may be a system, a method, and/or a computer program product. The computer program product may include a computer readable storage medium (or media) having computer readable program instructions thereon for causing a processor to carry out aspects of the embodiments. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission equipment, cellular communication devices, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments.

Aspects of the embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. In this way, the flowchart and block diagrams in the FIGS. illustrate the architecture, operability, and operation of possible implementations of systems, methods, and computer program products according to various embodiments. Further, each block in the flowchart or block diagrams may represent a module, segment, or portion of instructions, which comprises one or more executable instructions for implementing the specified logical operation(s). In some alternative implementations, the operations noted in the block may occur out of the order noted in the FIGS. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While embodiments have been described in detail in connection with only a limited number of embodiments, it should be readily understood that the embodiments are not limited to such disclosed embodiments. Rather, the embodiments can be modified to incorporate any number of variations, alterations, substitutions or equivalent arrangements not heretofore described, but which are commensurate with the spirit and scope of the embodiments. Additionally, while various embodiments have been described, it is to be understood that aspects of the invention may include only some of the described embodiments. Accordingly, the invention is not to be seen as limited by the foregoing description, but is only limited by the scope of the appended claims.

The invention claimed is:

1. A method for performing data read, processing, and decision operations on raw digital data by directly receiving and processing raw digital data by a processor of an online condition monitoring system in real-time and without latency, thereby eliminating replacement, upgrading, or maintenance costs associated with specialized hardware, the method comprising:
 compiling, by the processor coupled to a memory of the online condition monitoring system, the raw digital data to organize, transform, and capture event signatures to produce compiled data,
 the raw digital data being converted by an analog to digital converter from analog sensor data produced by at least one sensor coupled to a mechanical system, the analog to digital converter being in electrical communication with the at least one sensor and the online condition monitoring system;
 performing, by the processor, a signal analysis operation comprising a real-time low latency signal processing on the compiled data to produce digitally analyzed data;
 comparing, by the processor, the digitally analyzed data to at least one threshold to output corresponding values,
 wherein the at least one threshold is compared against the event signatures by the online condition monitoring system to determine a normal operation, operation within an accepted threshold, failure indications, or complete failures of the mechanical system; and
 utilizing, by the processor, the corresponding value to determine whether to issue an event notification.

2. The method of claim 1, wherein the raw digital data is high data rate digital data.

3. The method of claim 1, further comprising:
 buffering the raw digital data prior to the compiling of the digital data.

4. The method of claim 1, further comprising:
 utilizing the corresponding value to determine whether to store the digitally analyzed data.

5. A condition monitoring system comprising a processor and a memory storing thereon program instructions for performing data read, processing, and decision operations on raw digital data in real-time and without latency by directly receiving and processing raw digital data by the processor, thereby eliminating replacement, upgrading, or maintenance costs associated with specialized hardware, the program instructions executable by the processor to cause the system to perform:
 compiling the raw digital data to organize, transform, and capture event signatures to produce compiled data,
 the raw digital data being converted by an analog to digital converter from analog sensor data produced by at least one sensor coupled to a mechanical system, the analog to digital converter being in electrical communication with the at least one sensor and the condition monitoring system;

performing, by the processor, a signal analysis operation comprising a real-time low latency signal processing on the compiled data via a signal analysis operation to produce digitally analyzed data;

comparing the digitally analyzed data to at least one threshold to output corresponding values, wherein the at least one threshold is compared against the event signatures by the online condition monitoring system to determine a normal operation, operation within an accepted threshold, failure indications, or complete failures of the mechanical system; and utilizing the corresponding value to determine whether to issue an event notification.

6. The condition monitoring system of claim 5, wherein the digital data is high data rate digital data.

7. The method of claim 1, wherein the event signatures are data values corresponding to a real-time state of the mechanical system being monitored by the online condition monitoring system.

8. The method of claim 1, wherein the compiled data is raw and organized data.

* * * * *